US011051658B2

(12) United States Patent
Neubert et al.

(10) Patent No.: US 11,051,658 B2
(45) Date of Patent: Jul. 6, 2021

(54) COVER ELEMENT FOR A PREPARATION VESSEL OF A FOOD PROCESSOR

(71) Applicant: Vorwerk & Co. Interholding GmbH, Wuppertal (DE)

(72) Inventors: Isabell Neubert, Wildberg (DE); Felix Thies, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 279 days.

(21) Appl. No.: 16/249,999

(22) Filed: Jan. 17, 2019

(65) Prior Publication Data

US 2019/0216265 A1 Jul. 18, 2019

(30) Foreign Application Priority Data

Jan. 17, 2018 (DE) .................... 20 2018 100 251.1

(51) Int. Cl.
| | | |
|---|---|---|
| *A47J 43/07* | (2006.01) | |
| *A47J 19/02* | (2006.01) | |
| *A47J 36/06* | (2006.01) | |
| *A47J 43/046* | (2006.01) | |

(52) U.S. Cl.
CPC ........... *A47J 43/0716* (2013.01); *A47J 19/02* (2013.01); *A47J 19/023* (2018.08); *A47J 36/06* (2013.01); *A47J 43/046* (2013.01)

(58) Field of Classification Search
CPC ........ A47J 19/02; A47J 19/023; A47J 43/046; A47J 43/0716; A47J 36/06; A47J 31/4407; B30B 9/02; B30B 9/06

USPC .................. 100/213; 220/293, 296, 298, 300
See application file for complete search history.

(56) References Cited

U.S. PATENT DOCUMENTS

| | | | | |
|---|---|---|---|---|
| 4,106,401 A | * | 8/1978 | Ackeret ................ | A47J 19/023 99/508 |
| 6,899,022 B2 | * | 5/2005 | Greenberg ............ | A47J 19/023 99/505 |
| 9,095,169 B1 | * | 8/2015 | Foley ........................ | A23L 2/06 |
| 9,290,307 B2 | * | 3/2016 | Arnold .................. | A47J 43/046 |

(Continued)

FOREIGN PATENT DOCUMENTS

| | | |
|---|---|---|
| CN | 203 407 941 U | 1/2014 |
| CN | 207 202 774 U | 4/2018 |

(Continued)

*Primary Examiner* — Shelley M Self
*Assistant Examiner* — Katie L. Parr
(74) *Attorney, Agent, or Firm* — Collard & Roe, P.C.

(57) ABSTRACT

A cover element for at least partially covering a vessel opening of a preparation vessel of a food processor and/or a cover opening of a vessel cover for the preparation vessel, wherein the cover element has a radially outwardly facing support edge to be supported on the preparation vessel and/or vessel cover. The support edge has a continuously curved base contour viewed in the axial direction, and has at least two support elements, which lie opposite each other, are separate from each other and protrude over the base contour. The support elements extending in an imaginary circular ring surface that reaches from a radially outer edge of the support elements up to the base contour are identically designed on both opposing sides viewed in the axial direction and formed in the same plane extending perpendicular to the axial direction.

8 Claims, 10 Drawing Sheets

(56) References Cited

U.S. PATENT DOCUMENTS

| | | | |
|---|---|---|---|
| 2003/0005832 A1* | 1/2003 | Wang | A47J 19/023 100/213 |
| 2003/0075057 A1* | 4/2003 | Saunders | A47J 19/023 99/495 |
| 2015/0208868 A1* | 7/2015 | Caldewey | A47J 43/0777 366/243 |
| 2017/0245668 A1 | 8/2017 | Upston et al. | |

FOREIGN PATENT DOCUMENTS

| | | |
|---|---|---|
| EP | 1 917 889 A1 | 5/2008 |
| EP | 2 698 088 B1 | 1/2015 |
| EP | 2 989 947 A1 | 3/2016 |
| GB | 2 547 683 A | 8/2017 |

\* cited by examiner

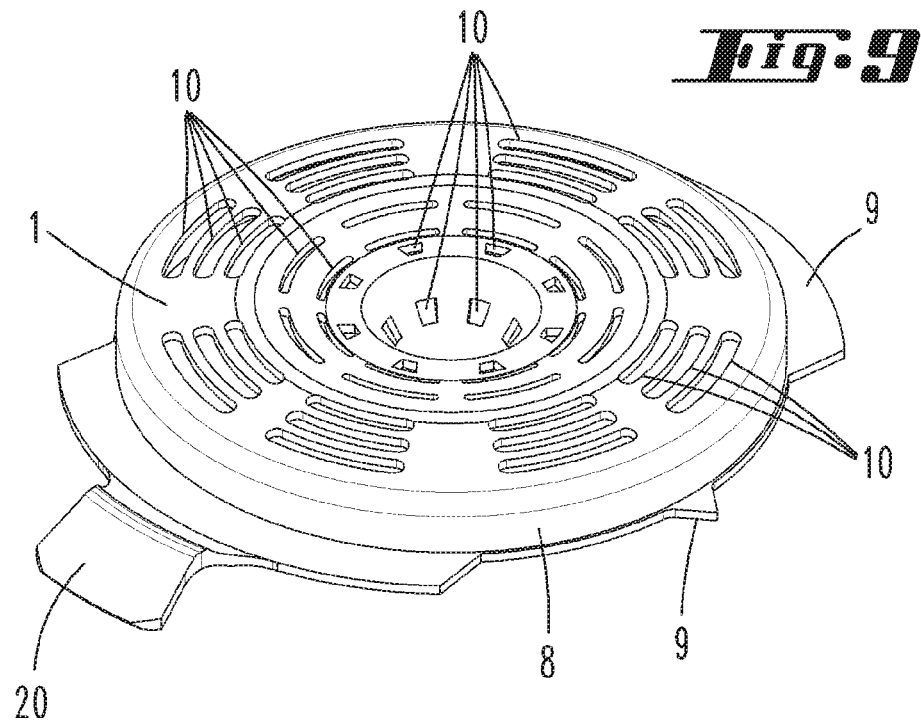
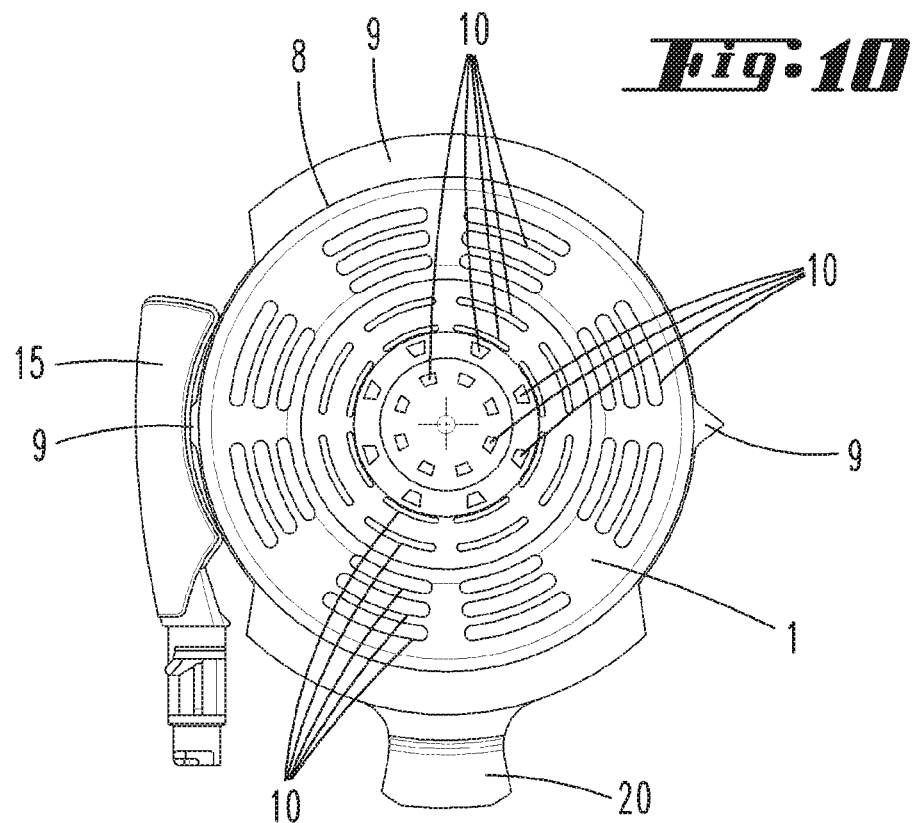

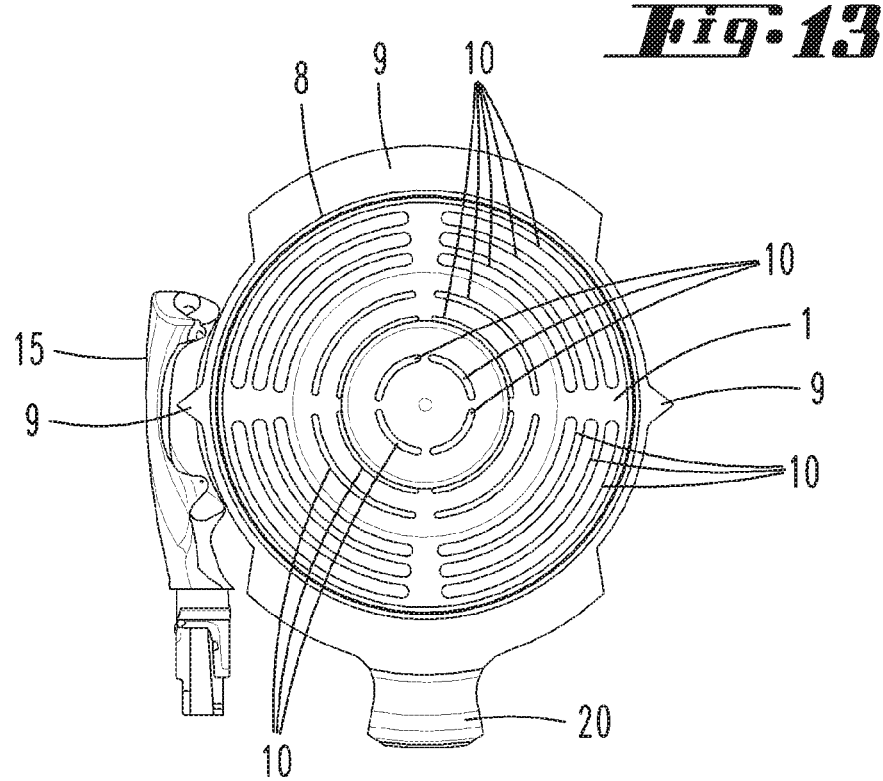
Fig. 13
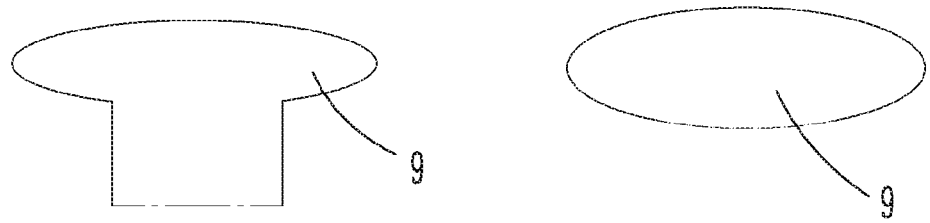
Fig. 14 Fig. 15
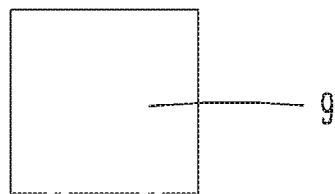
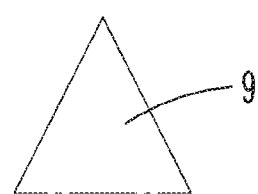
Fig. 16 Fig. 17

COVER ELEMENT FOR A PREPARATION VESSEL OF A FOOD PROCESSOR

CROSS-REFERENCE TO RELATED APPLICATIONS

This application claims priority under 35 USC 119 of German Patent Application No. 20 2018 100 251.1, filed on Jan. 17, 2018, the disclosure of which is herein incorporated by reference.

BACKGROUND OF THE INVENTION

Field of Technology

The invention relates to a cover element for at least partially covering a vessel opening of a preparation vessel of a food processor and/or a cover opening of a vessel cover for the preparation vessel, wherein the cover element has a radially outwardly facing support edge to be supported on the preparation vessel and/or vessel cover, wherein the support edge has a continuously curved base contour viewed in the axial direction, and the support edge has at least two support elements, which lie opposite each other in relation to a radial direction, are separate from each other viewed in a circumferential direction, and protrude over the base contour.

In addition, the invention relates to a food processor with a base device, a preparation vessel that can be arranged on the base device, and a cover element for the preparation vessel.

Prior Art

Food processors of the kind in question are known. In particular in the household sector, the latter are used for preparing meals and/or processing foodstuffs. For example, the food processors have a base device and a preparation vessel that can be connected with the base device. For example, the floor area of the preparation vessel carries an agitator, which can be driven by an electric motor of the food processor, in particular with the preparation vessel in a position assigned to the food processor. The preparation vessel can further have allocated to it a heating device, which heats cooking items located in the preparation vessel. During food processor operation, the preparation vessel is usually covered by a vessel cover, which can be locked onto the preparation vessel preferably by an electric motor, so as to thereby prevent the vessel cover from being lifted or removed. Also known in this conjunction is that both the vessel cover and a vessel edge of the preparation vessel have a circular outline, thereby enabling a preferably undirected placement of the vessel cover onto the preparation vessel in the circumferential direction of the preparation vessel. The in particular circular outline has a continuously curved base contour, which given a circular shape over the entire circumference has a constant radius of curvature.

Also known is that the vessel cover has a cover opening, through which ingredients can be introduced into the preparation vessel, or which serves to equalize pressure during a cooking process of the food processor. The cover opening can further be sealed at least partially by a measuring cup or the like, so as to prevent a reaching into the preparation vessel and/or an excessive leakage of hot steam from the preparation vessel.

For example, documents EP 2 989 947 A1 and EP 2 698 088 B1 disclose a food processor with a preparation vessel and a vessel cover that seals the preparation vessel. The preparation vessel and vessel cover are locked by means of a locking element. In a locking position, the locking element extends over a partial area of the vessel cover. For this purpose, the locking element can be pivoted around an axis from the release position into the locking position, and vice versa. The locking element is preferably elongated in the direction of extension of the axis. The locking element is connected with an electric motor arranged in the food processor, which causes the locking element to rotate from the release position into the locking position and vice versa.

Known from GB 2547683 A is a food processor with a vessel cover that consists of three parts, specifically an outer cover part, an inner cover part and a gasket. These parts must always be arranged together for operating the food processor. They can only be separated from each other for cleaning purposes. Locking can only take place if the gasket is arranged on the inner cover part, after which the outer cover part is to be turned into a locking position. The outer cover part has a locking projection that is blocked in the locking position. Only this is what locks the cover as a whole to the preparation vessel.

Known from US 2017/0245668 A1 is a cover element configured as a citrus juicer for a preparation vessel. The latter has a support edge that continuously extends in an identical radial manner in the circumferential direction. It can also be placed on the edge of the preparation vessel with one side in only an axial direction, since a handle protruding in essentially an axial direction is formed on the other side. Also known from EP 1917889 A1 for a preparation vessel is a support element configured as a citrus juicer, which can be placed into the opening of a vessel cover. The cover element designed with a removable floor part can also be placed in the vessel cover in only one orientation in an axial direction. In cross section, the support edge expands conically outward. Known from CN 207202774 U is a cover element for a preparation vessel, which can be fastened due to clamping projections formed on the support edge, which are formed on one side of the support edge on the lower side in the use state. This cover element can also be fastened to the preparation vessel only in one direction with respect to its axial orientation. The same ultimately also holds true with regard to CN 203407941 U. Here as well, locking elements are formed on the support edge only on one side relative to the axial direction.

Proceeding from the described prior art, in particular GB 2547683 A, the invention deals with the task of indicating an advantageously configured cover element, which can be used as an alternative or in addition to a vessel cover on the preparation vessel.

SUMMARY OF THE INVENTION

Proceeding from the aforementioned prior art, the object of the invention is to advantageously further develop a cover element that can be used as an alternative or in addition to a vessel cover on the preparation vessel.

This object is achieved by a cover element for at least partially covering a vessel opening of a preparation vessel of a food processor and/or a cover opening of a vessel cover for the preparation vessel, wherein the cover element (1) has a radially outwardly facing support edge to be supported on the preparation vessel and/or vessel cover, wherein the support edge has a continuously curved base contour viewed in the axial direction, and the support edge has at least two support elements, which lie opposite each other in relation to a radial direction, are separate from each other viewed in a circumferential direction, and protrude over the base contour. The support elements extend in an imaginary circular ring surface reaching from a radially outer edge of the support elements up to the base contour. The support elements are identically designed on both opposing sides viewed in the axial direction and formed in the same plane extending perpendicular to the axial direction.

According to the invention, the support elements are able to get into a locking area of a locking device of the food processor having the preparation vessel with the cover element and preparation vessel or cover element and vessel cover in a connected state. The support elements form radial projections relative to the base contour of the cover element, which ensure that the cover element cannot be removed while operating the food processor. As a consequence, the cover element can especially advantageously be used as a splash guard to prevent foodstuffs from splashing out of the preparation vessel. The cover element especially advantageously has at least two support elements, wherein the latter are configured and arranged in such a way as to hold the cover element on radially opposing areas of the cover element. The cover element preferably has a plurality of support elements in the circumferential direction, in particular equidistantly arranged support elements, which prevent all support elements from being simultaneously unscrewed from the locking device. The cover element according to the invention can be used in addition to a vessel cover of the preparation vessel, wherein an outer contour of the vessel cover is preferably larger than the base contour of the cover element, wherein the support elements form projections, between which the vessel cover remains visible as viewed from an axial direction. The cover element can be designed with a smaller diameter than the vessel cover itself, for example in such a way that predominantly a cover opening of the vessel cover is covered. As a result, the cover element can be manufactured with the least possible material outlay, weight and size, while still providing optimal protection against items to be prepared spraying out of the preparation vessel. In particular, the support elements can have a lower material thickness than other partial areas of the support edge of the cover element, so that the support elements can be accommodated by the locking device without generating an appreciable difference in height.

The support elements separated in the circumferential direction extend in a plane perpendicular to the axial direction, and in this way are advantageously suitable to be able to rest on the edge of the preparation vessel or vessel cover in both axial directions, i.e., turned by 180 degrees.

The support element is preferably designed so as to border a front surface of the cover element in relation to an axial direction, so that the support element rests on the preparation vessel or vessel cover when connected with the preparation vessel or vessel cover, and holds other partial areas of the cover element outside of the preparation vessel, and/or creates a contact surface for the locking device, the height of which corresponds to the locking height when using a vessel cover on the preparation vessel. In this embodiment, it is recommended that a distance between the two end faces of the cover element correspond roughly to the height on the preparation vessel provided by the vessel cover, so that the locking position of the locking device remains constant.

The support edge of the cover element can have a plurality of support elements, which are connected with each other to yield an overall form that protrudes over the base contour. For example, this can result in an undulating circumferential area of the support edge or the like. The support elements can have differing shapes and sizes independently of the above. For example, suitable shapes include triangles, squares, rectangles, ovals or even free forms. The support elements are especially preferably injection molded to the base contour of the cover element.

It is proposed that a support element radially protrude over the base contour by at least 10 mm, preferably by at least 15 mm. The length and/or area of the support element is preferably large enough to enable the latter to protrude far enough into the locking device, and thereby be reliably pressed against the preparation vessel or vessel cover by the locking device. This yields an optimal overlap between the cover element and locking area of the locking device.

The invention also relates to a cover element for at least partially covering a vessel opening of a preparation vessel of a food processor and/or a cover opening of a vessel cover for the preparation vessel, wherein the cover element is designed as a lemon squeezer with a central, conical elevation in relation to a surface side. In particular, the cover element can additionally be designed according to one of the embodiments described above. The cover element preferably serves as a splash guard on the one hand, and as a lemon squeezer on the other, which can be placed on the preparation vessel, if necessary interspersing an additional cover element with a cover opening. The central, conical elevation serves as a mandrel structure for squeezing citrus fruits, wherein the squeezed juice flows down off the elevation, and can flow into the preparation vessel through passage openings of the cover element. Pieces of fruit and peels can preferably not pass through the correspondingly dimensioned passage openings of the cover element, so that they are retained. If the cover element designed as a lemon squeezer is placed onto the preparation vessel the other way around, i.e., turned, the central, conical elevation additionally serves as a splash guard against preparation items being upwardly sprayed out of the preparation vessel. In particular, it is recommended that the elevation have a design corresponding to the size and shape of a cover opening of a vessel cover, so that the elevation can be introduced into the cover opening, so as to reliably prevent items to be prepared from spraying out. In this case, the elevation preferably protrudes so far into the cover opening that a tip of the elevation protrudes over a cover underside, if possible a cover edge drawn in toward the interior of the preparation vessel.

The conical elevation can have protruding ribs and/or a plurality of passage openings. The ribs serve to optimally squeeze out citrus fruits on the elevation. The passage openings are designed for the lemon squeezer function of allowing the juice into the preparation vessel, and when used in reverse, i.e., with the elevation protruding into the preparation vessel, to allow steam to be discharged through the passage openings. Splashes can be effectively contained due to the inclined position of the opening planes of the passage openings relative to a floor area of the preparation vessel or a rotational plane of an agitator.

It is further proposed that the cover element have a plurality of passage openings lying one behind and/or next to the other in a radial direction and/or circumferential direction. This configuration allows the cover element to be used not just to prevent preparation items from splashing out of the preparation vessel, but rather to also allow media to exit and/or enter the preparation vessel in a targeted manner. As a consequence, at least some of the passage openings can be configured so as to allow steam to escape the preparation vessel, in order to enable an optimal pressure equalization of the preparation vessel during a cooking process. In addition, the cover element can serve as a strainer, so as to allow liquid to drain from the preparation vessel, even with the cover element in place. When tilting the preparation vessel with the cover element in place, the chunky preparation items remain in the preparation vessel, while water can flow through the passage opening of the cover element. This results in a multifunctional cover element for the preparation vessel. In addition, the cover element can have a conical structure on the side facing toward the preparation vessel, which prevents splashes of preparation items from being able to pass through the passage openings. The conical structure can be the rear side of the elevation of a structure designed as a lemon squeezer. The passage openings formed on the conical shape preferably are inclined to a floor surface of the preparation vessel, in particular also inclined to a rotational plane of an agitator, which is arranged inside of the preparation vessel, thereby making it more difficult for splashes to undesirably penetrate through the passage openings given the geometric circumstances. However, steam can be discharged unimpeded.

In particular, it is proposed that a passage opening have a size of approx. $1 \text{ mm}^2$ to $200 \text{ mm}^2$, in particular of $10 \text{ mm}^2$ to $100 \text{ mm}^2$. The passage openings can have differing shapes and sizes. For example, several or all passage openings can be given a circular design, or several or all passage openings can be given an elongated or arched design. The shape and/or size of the passage openings can vary depending on the position of the respective passage opening on the cover element, and possibly on a formation of specific functional zones on the cover element. For example, a functional zone of the cover element serving predominantly as a splash guard can have smaller passage openings than a functional zone that serves predominantly for straining.

In this conjunction, it is further proposed that passage openings that are sequential in the radially outwardly facing direction have increasing sizes, so that a passage opening formed closer to the support edge is larger than a passage opening that is spaced further apart from the support edge by comparison. Viewed from the inside out—in relation to the radial direction of the cover element—the passage openings can thus get larger, so that the cover element near its support edge is suitable for performing the function of a strainer, wherein liquid can be optimally let out of the preparation vessel on the one hand, and preparation items are prevented from exiting the preparation vessel on the other. In contrast, a central functional area of the cover element can have relatively small passage openings, for example, which are suitable for allowing exclusively steam to pass through, while holding back splashes of hot preparation items.

In addition to the cover element described above, the invention further proposes a food processor with a base device, a preparation vessel that can be arranged on the base device, and a cover element for the preparation vessel, wherein the cover element is initially preferably designed according to one or several of the embodiments described above.

As a consequence, the advantages and features for the food processor according to the invention are the same as described before in relation to the cover element. In particular, the cover element can advantageously interact with a locking device of the food processor in such a way as to lock the cover element on the preparation vessel and/or a vessel cover of the preparation vessel by means of the locking device. The cover element can initially preferably be designed according to one or several of the embodiments described above.

In particular, the food processor can have a locking device for locking the cover element with the preparation vessel, wherein the cover element has a radially outwardly facing support edge to be supported on the preparation vessel and/or a vessel cover that at least partially covers the preparation vessel, wherein the support edge has a continuously curved base contour viewed in the axial direction, wherein the support edge has at least two support elements that lie opposite each other relative to a radial direction and protrude over the base contour, and wherein the locking device has at least two locking elements that can be driven by an electric motor, which at least partially grip over the support elements in relation to the locked state. The support elements of the cover element engage into the locking device with the preparation vessel and cover element in a locked state. Depending on the desired function, the cover element can either be placed directly on a vessel edge of the preparation vessel, or on a vessel cover, which at least partially covers the preparation vessel. For example, the locking elements can be designed as locking rollers that can be driven by an electric motor, which can be displaced into a release position from a locking position, in particular be rotated around an axis. In the locking position, the locking elements grip over a partial area of the preparation vessel, preferably formed by an outwardly facing upper edge of the preparation vessel, with the cover element arranged thereon, and possibly a vessel cover arranged between the preparation vessel and cover element. The support elements of the cover element are designed in such a way corresponding to the position of the locking elements on the food processor as to protrude into the locking area of the locking elements. For this purpose, the support elements can protrude over the base contour of the support edge of the cover elements by at least 10 mm, preferably by at least 15 mm. The cover elements are preferably configured in such a way that at least one support element always protrudes into the locking area of a locking element independently of a rotational position of the cover element on the preparation vessel, so that the cover element cannot be loosened by unscrewing a single support element from the locking area of the locking element. The support elements preferably have a material thickness so slight as to not overly enlarge the usual height of the locking area. In particular, a material thickness of 0.5 mm to 3 mm is proposed.

The preparation vessel can have a vessel cover with a central cover opening, wherein the vessel cover is arranged between the preparation vessel and cover element in relation to a locked state and in relation to an axial direction. In the locking position, the cover element is located above the central cover opening of the preparation vessel, so that preparation items that spray upward inside of the preparation vessel are sprayed in front of the cover element, and can thus not get out of the preparation vessel.

The cover element can be designed as a lemon squeezer with a central, conical elevation in relation to a surface side, wherein the elevation can engage into the central cover opening of the vessel cover in relation to a locked state. In this configuration, the elevation of the lemon squeezer is designed corresponding to the cover opening of the vessel cover in such a way that the central cover opening of the vessel cover can be sealed by the elevation of the cover element. Through openings can be formed in the elevation, which make it possible to dissipate steam from the preparation vessel.

In conjunction with the food processor, the cover element can have various functions, as explained before, specifically also functioning as a strainer in addition to a splash guard and lemon squeezer, wherein through openings formed in the cover element allow the passage of liquids, but hold back solid preparation items located in the preparation vessel. A user of the food processor can also utilize various partial areas of the cover element for different tasks. For example, a partial area with relatively large through openings can be used for straining purposes, while an area with contrastingly smaller passage openings serves to retain liquid and cooking items, but allows steam to pass through. In any event, the cover element must be designed in such a way as provide a splash guard, so as to prevent liquid from undesirably spraying out of the preparation vessel.

BRIEF DESCRIPTION OF THE DRAWINGS

The invention will be explained in greater detail below based on exemplary embodiments. In the drawings:

FIG. 9 is a perspective view of the cover element and vessel cover according to FIG. 8, FIG. 10 is a top view of the cover element and vessel cover according to FIG. 9, as well as a locking element (locking state), FIG. 13 is a cover element according to another embodiment with a locking element (release state), FIG. 14 is a possible shape for a support element, FIG. 15 is another possible shape for a support element, FIG. 16 is another possible shape for a support element, FIG. 17 is another possible shape for a support element.

DESCRIPTION OF THE EMBODIMENTS

Figure 1:
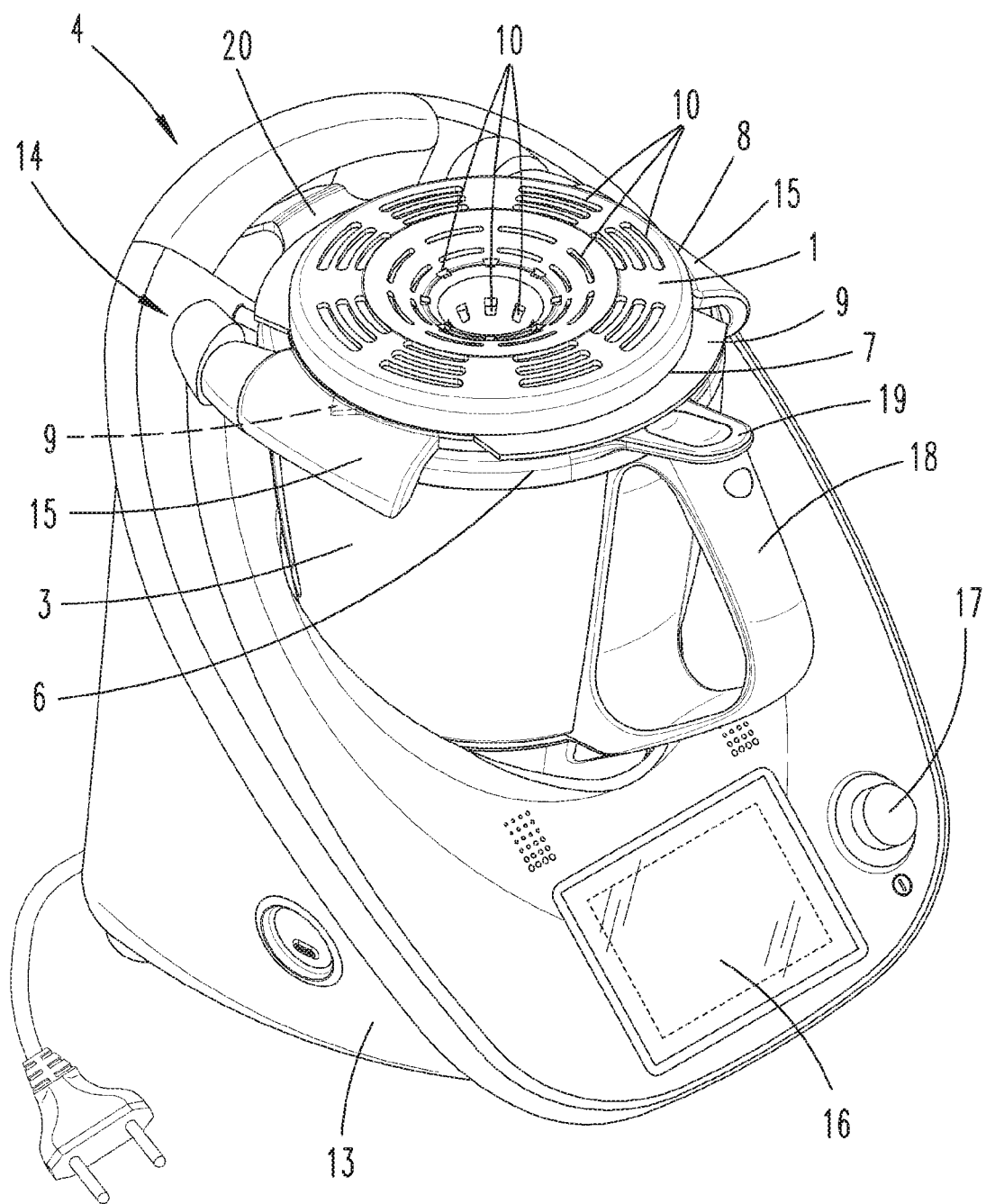
FIG. 1 is a food processor according to the invention with a preparation vessel, a vessel cover and a cover element.

FIG. 1 only exemplarily shows an electric motor-driven food processor 4, which is here designed as a combination cooker/mixer. For example, the food processor 4 has a base device 13 for the detachable arrangement of a preparation vessel 3. The preparation vessel 3 has a vessel handle 18 and a vessel cover 6 with a cover opening 5 (see FIG. 2) and a cover handle 19. The cover opening 5 is covered by a cover element 1 according to the invention. For example, the cover element 1 is here designed as a splash guard element, which prevents preparation items, for example hot media, from being able to splash out of the preparation vessel 3.

Also arranged on the base device 13 of the food processor 4 are a display 16 and a switch 17, which can be used to control a menu guide of the food processor 4, for example to control the preparation of meals inside of the preparation vessel 3 based on a recipe which can also be selected therewith. For example, the display 16 can show the user individual processing steps in an automatic recipe preparation process, as well as the required ingredients for preparation, which the user must fill into the preparation vessel 3. For example, the user can confirm an entry, start processing steps and the like by means of the switch 17. The vessel cover 6 of the preparation vessel 3 is fixed to the preparation vessel 3 by means of a locking device 14, rendering the preparation vessel 3 unable to undesirably open with the food processor 4 in operation. The locking device 14 here has two locking elements 15 designed as locking rollers, which can rotate from a locking position into a release position and vice versa.

The base device 13 of the food processor 4 has a vessel receiving area, with which the preparation vessel 3 is detachably connected. For example, the vessel receiving area is here designed as a depression, into which the preparation vessel 3 can be placed. The vessel receiving area can have electrical contacts, which supply power to electrical consumers of the preparation vessel 3. To this end, for example, a strip with electrical contacts can be formed on the vessel receiving area, with which corresponding electrical contacts of the preparation vessel 3 interact. For example, a vessel floor of the preparation vessel 3 here has a floor opening (not shown), through which part of the agitator can be passed. The agitator can be connected with a motor shaft of an electric motor of the food processor 4. For example, the agitator can be a blade set with a plurality of blades, which protrude into the preparation vessel 3 and can comminute or mix the preparation items. In addition, a heating device (not shown) can be formed in a wall and/or the vessel floor of the preparation vessel 3. For example, the heating device can be a thick film heater, which is integrated into the material of the vessel wall, and supplies electrical energy to the power supply of the base device 13 of the food processor 4.

The cover element 1 has a support edge 7 to be supported on an edge of the preparation vessel 3 or vessel cover 6. Viewed from above or the side, the support edge 7 of the cover element 1 has a base contour 8. The base contour 8 is related to a top view, on the side of the cover element 1 on which rises a pot-shaped formation, which forms the base contour 8 and passes over into the support edge 7. Since the base of the cover element 1 is here round in design, the base contour 8 is correspondingly a circle. Several support elements 9 protrude outwardly over the base contour 8, wherein a respective two of the support elements lie opposite each other relative to the midpoint of the circular form, for example. The cover element 1 has a plurality of passage openings 10, which become larger proceeding from the midpoint radially outward. In addition, the cover element 1 has a cover element handle 20, which serves to remove and place the cover element 1 onto the preparation vessel 3 or vessel cover 6.

The base of the cover element 1, which as mentioned above is preferably pot-shaped, further also comprises a front surface of the cover element 1, the elevation 11 of which faces outwardly in the one axial alignment, wherein the conical elevation 11 is simultaneously directed into the interior of the preparation vessel 3 when in use. In the other axial alignment, the conical elevation 11 correspondingly faces outwardly, and the pot-shaped depression is subsequently present correspondingly radially inward to the support edge 7, which then passes over into the central elevation 11 further radially inward.

Figure 2:
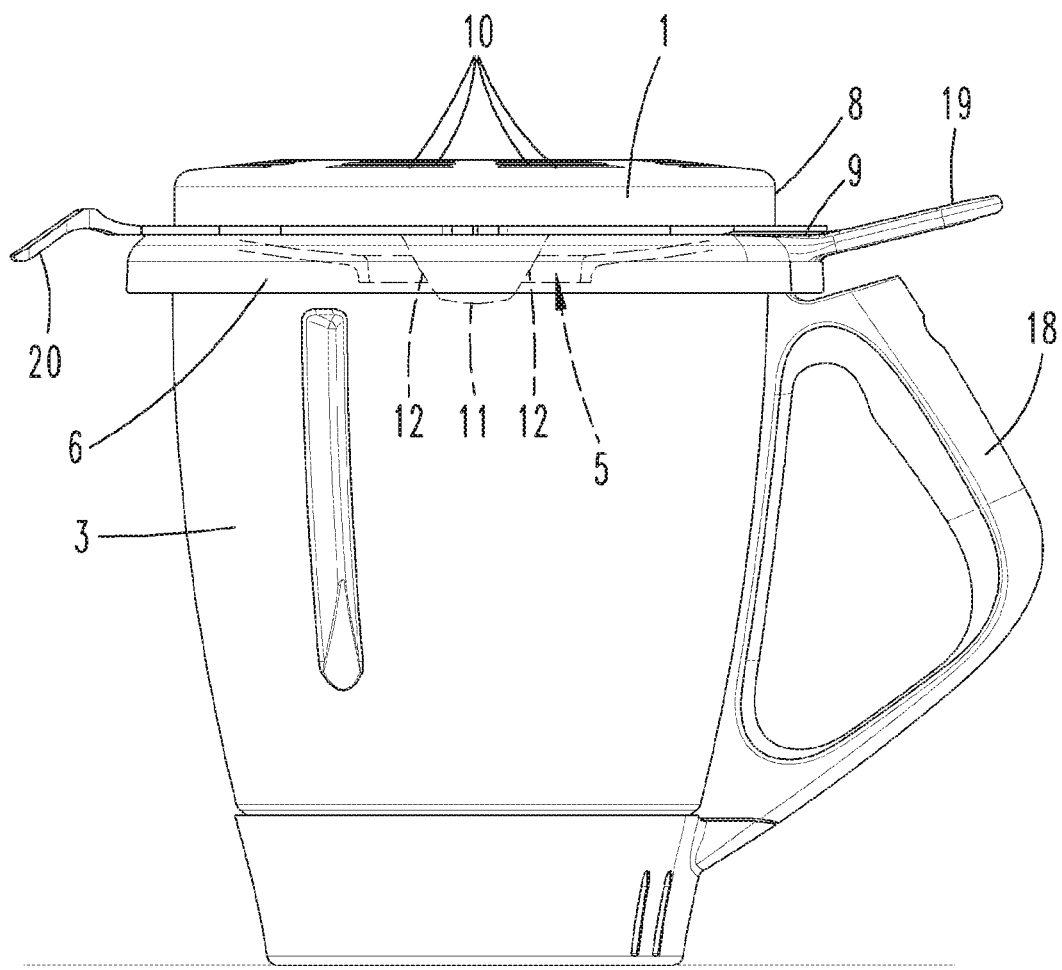
FIG. 2 is a side view of the preparation vessel with the vessel cover and cover element.

The cover element 1 can be used from two different sides, i.e., be placed on one of the two large surface sides depending on the function desired. FIGS. 1 and 2 show the cover element 1 from a first surface side, while FIGS. 3 to 5 show the cover element 1 from the opposing side, for example.

Figure 3:
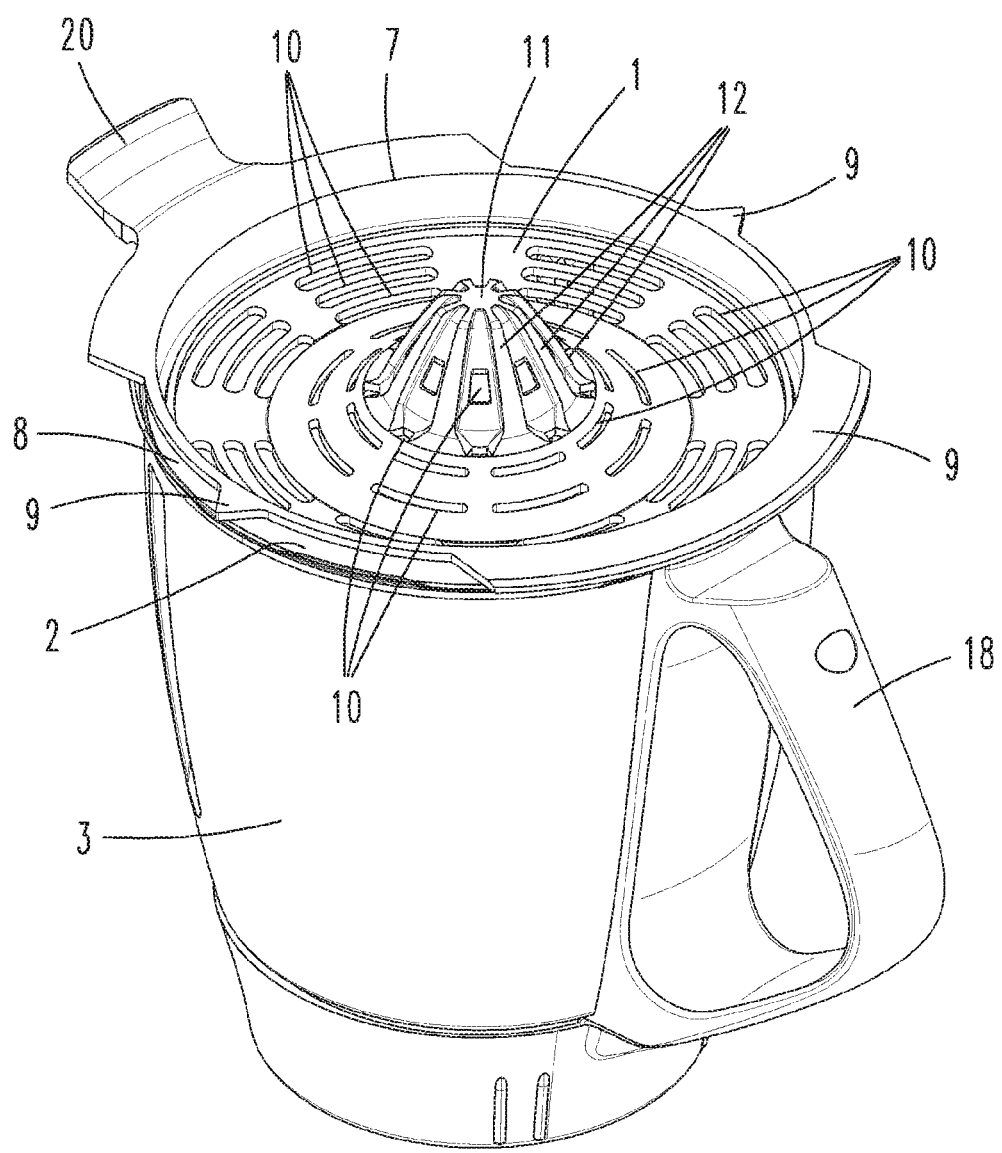
FIG. 3 is the preparation vessel with the cover element, wherein the cover element is placed turned on the preparation vessel as opposed to the position depicted on FIGS. 1 and 2 (without vessel cover interspersed)
Figure 4:
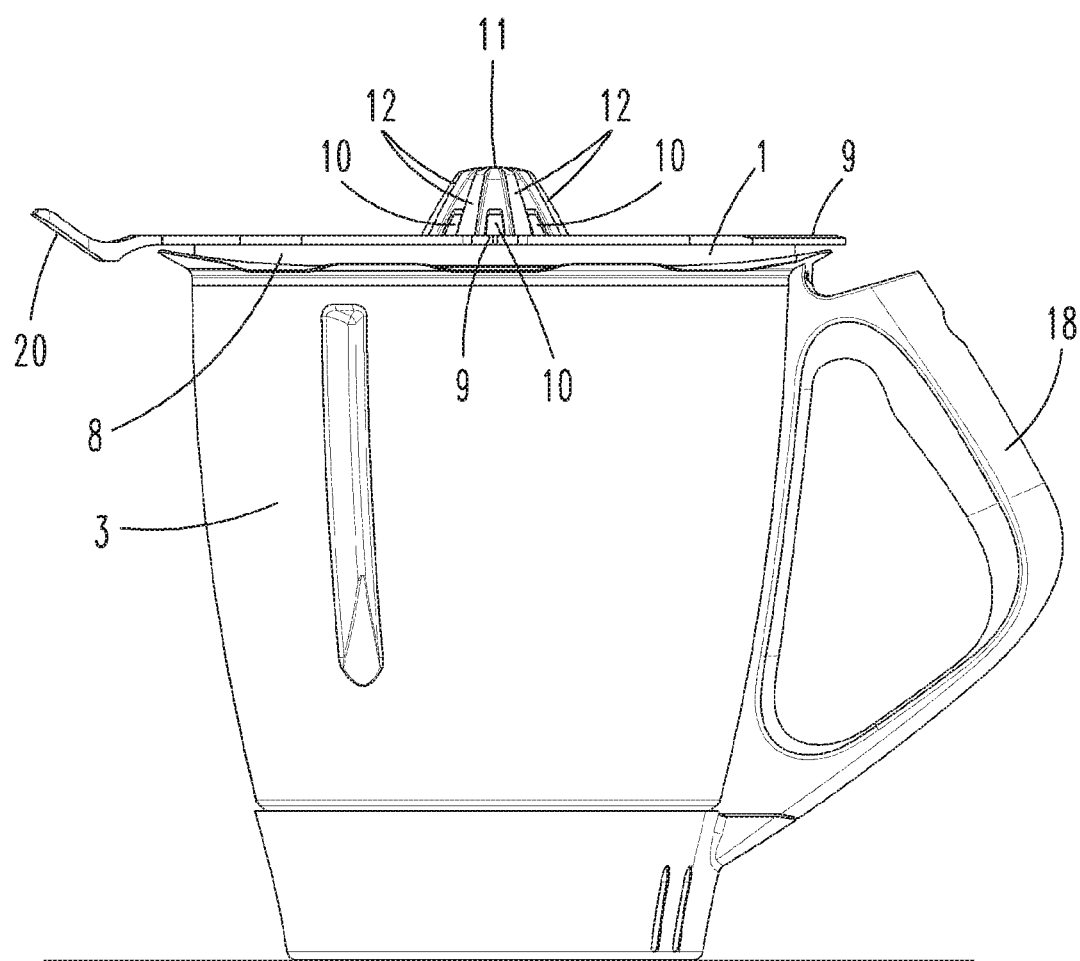
FIG. 4 is a side view of the preparation vessel with the cover element according to FIG. 3.

In FIGS. 3 and 4, the cover element 1 is placed directly onto the preparation vessel 3, i.e., without interspersing a vessel cover 6. The side of the cover element 1 which there faces upwardly is designed as a lemon squeezer, which has a central elevation 11. Several ribs 12 are formed on the central elevation 11 for squeezing out citrus fruits. Further located on the elevation 11 are passage openings 10, through which juice passes into the preparation vessel 3. The support elements 9 of the cover element 1 do not rest on the edge of the preparation vessel 3, but are rather spaced apart from the latter, specifically by an amount roughly corresponding to the height of a vessel cover 6 that is usually used with the preparation vessel 3.

Figure 5:
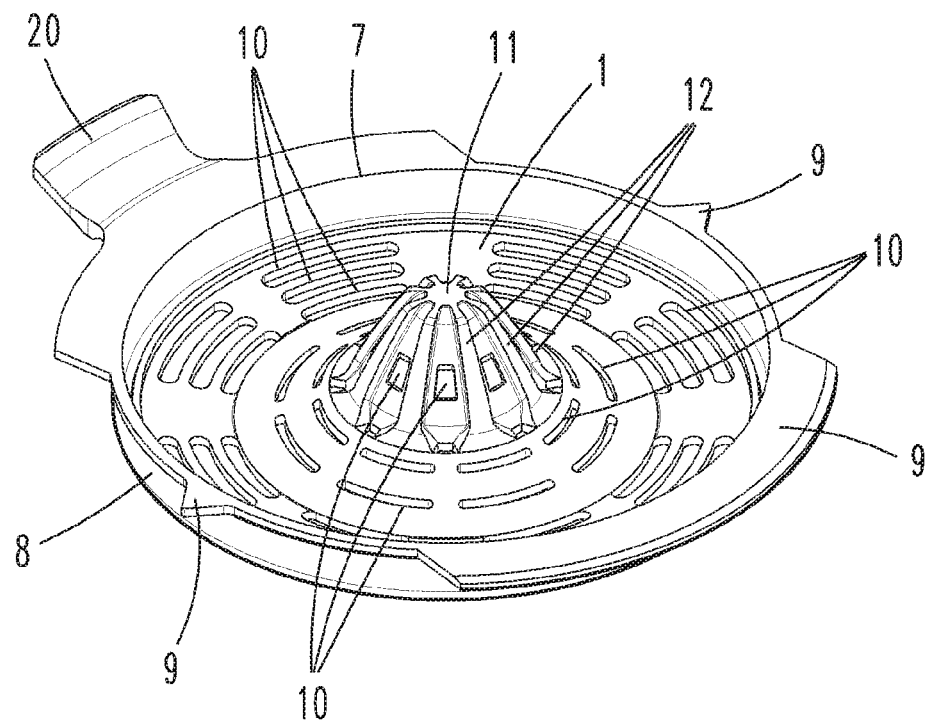
FIG. 5 is a perspective view of the side of the cover element shown on FIG. 3.
Figure 6:
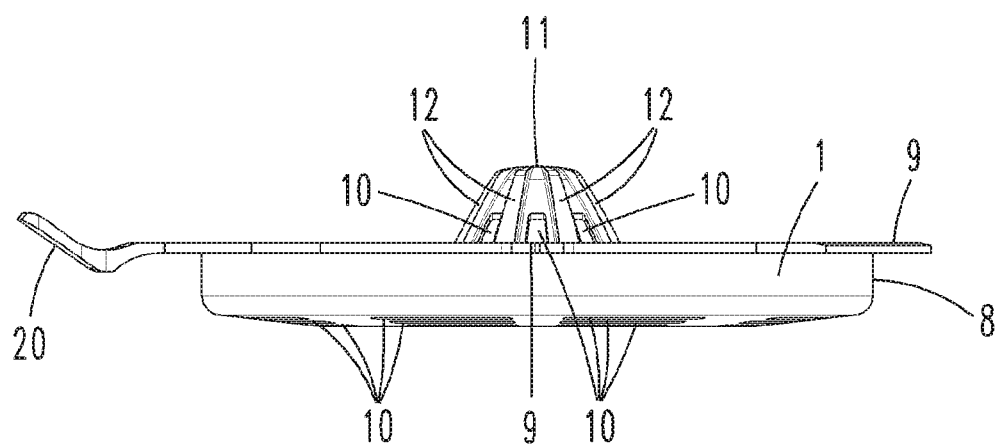
FIG. 6 is a side view of the cover element according to FIG. 5.
Figure 7:
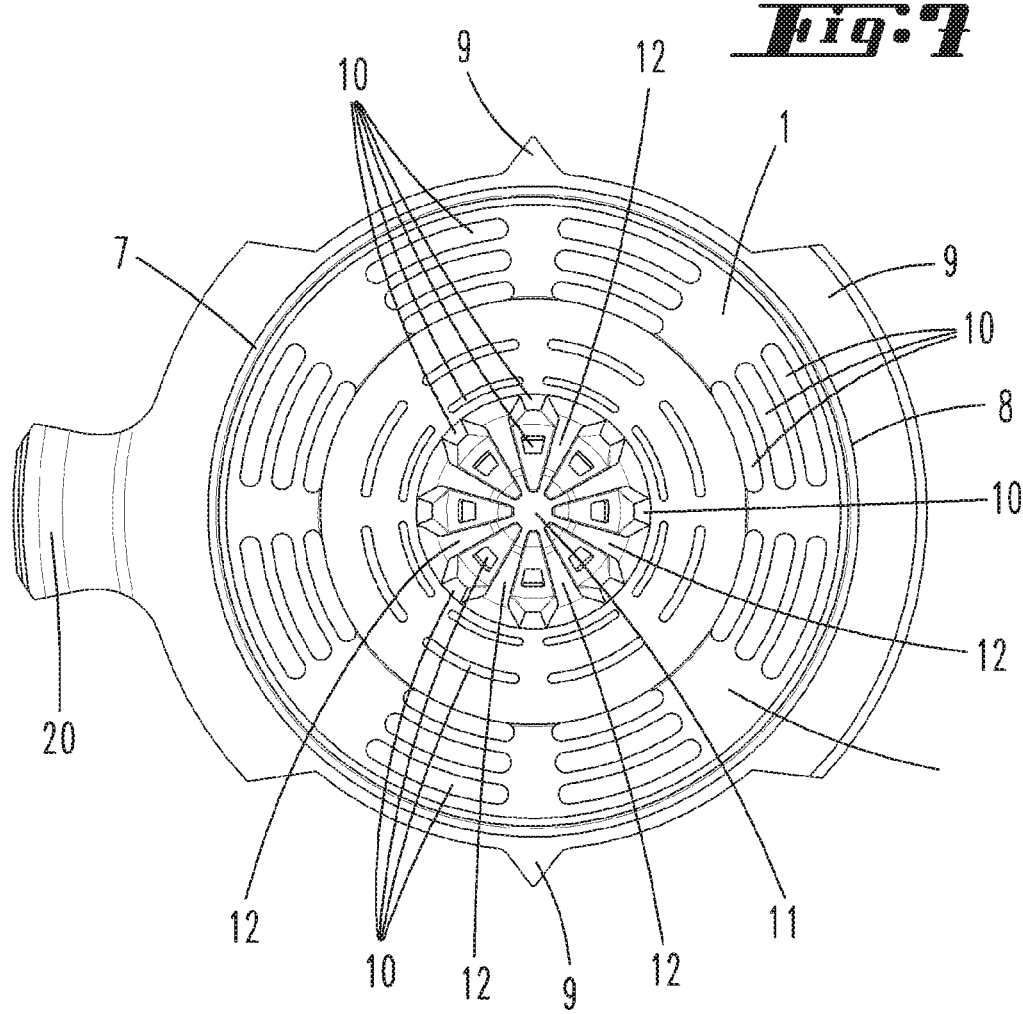
FIG. 7 is a top view of the cover element according to FIGS. 5 and 6.
Figure 8:
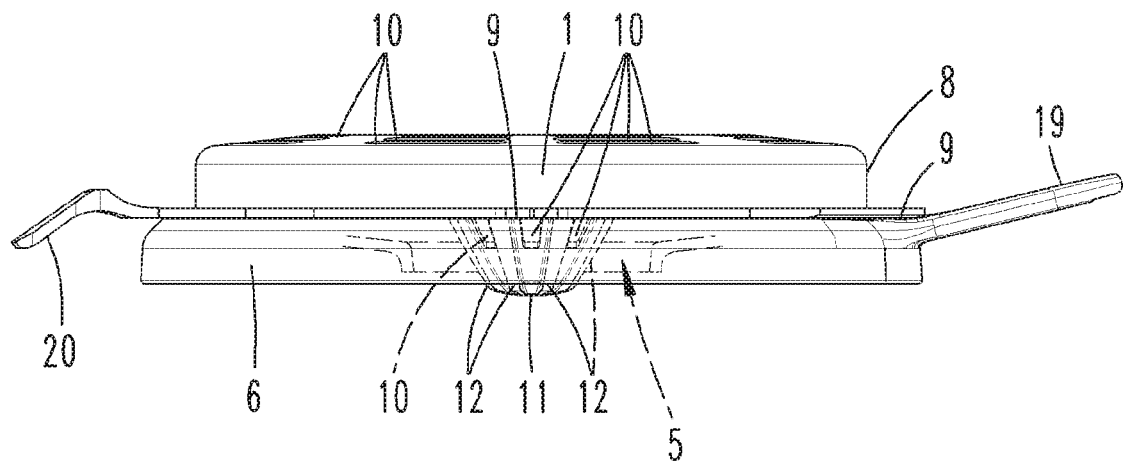
FIG. 8 is a side view of a vessel cover with cover element arranged thereon (corresponding to the configuration according to FIG. 1)

FIGS. 5 to 7 show the cover element 1 by itself, wherein the side of the cover element 1 designed as a lemon squeezer faces upward. FIGS. 8 to 10 show the cover element 1 in an orientation where the side designed as a lemon squeezer faces downward.

FIG. 8 shows a combination of a vessel cover 6 and cover element 1. The vessel cover 6 has a cover opening 5, into which the elevation 11 of the cover element 1 is placed. In this combination of the cover element 1 and vessel cover 6, which is also part of FIG. 1, the cover element 1 can be used as a splash guard during the preparation of preparation items inside of the preparation vessel 3. Due to its special construction with inclined walls, the elevation 11 of the cover element 1 inserted through the cover opening 5 serves as an additional splash guard, which ensures that splashes cannot force their way outside. The passage openings 10 formed in the elevation 11 serve to dissipate steam through the cover opening 5. If the cover element 1 is placed directly onto the edge of a preparation vessel 3 in the orientation shown without interspersing a vessel cover 6, the cover element 1 can advantageously be used as a strainer. The configuration of the passage openings 10, in particular with passage openings 10 that become larger radially outward proceeding from a midpoint, ensures that liquid can be poured out of the preparation vessel 3, but on the other hand prevents preparation items from being able to escape the preparation vessel 3.

The passage openings 10 of the embodiment of an exemplary cover element 1 shown on FIGS. 1 to 10 have an oblong, curved shape in relation to a surface area near the edge. By contrast, the central passage openings 10 of the elevation 11 are polygonal (or alternatively square or round) in design, for example, with roughly identical side lengths. For example, the oblong passage openings 10 have a width of 10 mm and a length of 50 mm (in relation to the largest/outermost passage openings 10). The passage openings 10 become smaller from radially outward to radially inward, with respect to both their length and width. This yields a straining function of the cover element 1 in the area of the support edge 7, while the passage openings 10 next to and on the elevation 11 serve more as a splash guard and to allow steam through.

FIG. 10 further shows a connection between the cover element 1 and a locking element 15 of the locking device 14 of the food processor 4. The arrangement is a partial cutout of the locking state of the preparation vessel 3 with the cover element depicted on FIG. 1 (without the vessel cover 6). In the depicted locking state, the support element 9 of the cover element 1 engages into the locking area of the locking element 15. The distances between the support elements 9 that are adjacent in the circumferential direction are dimensioned in such a way that a first support element 9 cannot be shoved out of the locking area of the locking element 15 (relative to a rotational direction) without an adjacent support element 9 getting into the locking area. This provides an optimal protection against an undesired removal of the cover element 1 from the preparation vessel 3. In this configuration, the cover element 1 has a total of four support elements 9, of which a respective two are paired symmetrically one opposite the other. Two of the support elements 9 are essentially triangular in design, and protrude over the base contour 8 of the support edge 7, here for example by 15 mm. The two other support elements 9 are formed like an arc on the base contour 8, and here protrude over the base contour by approx. 20 mm. The arched support elements 9 comprise a circumferential section of the cover element 1, which in relation to its outwardly facing edge area roughly cover a respective angular range of 85°.

Figure 11:
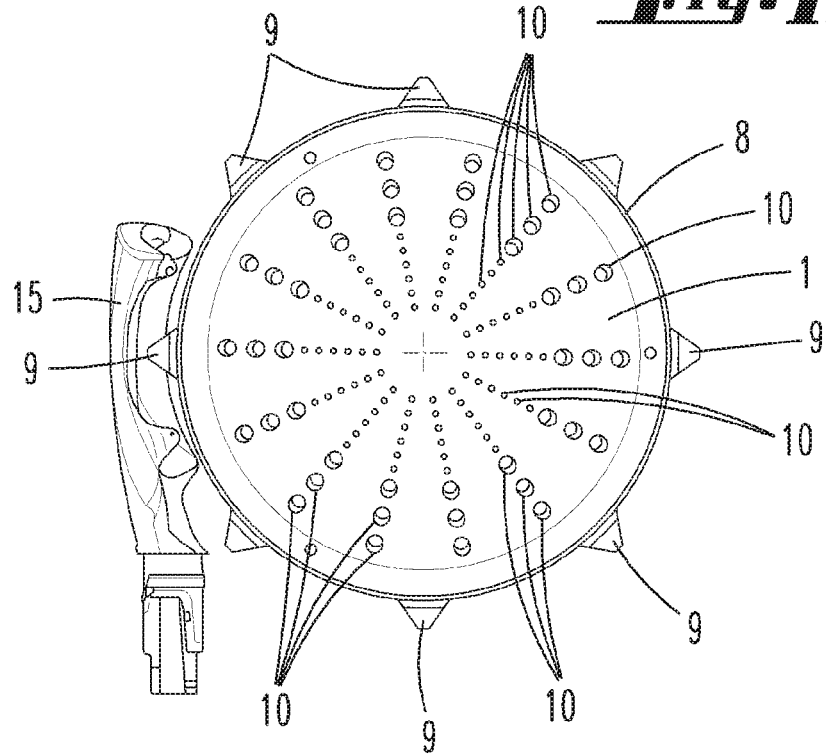
FIG. 11 is a cover element according to another embodiment with a locking element (release state)
Figure 12:
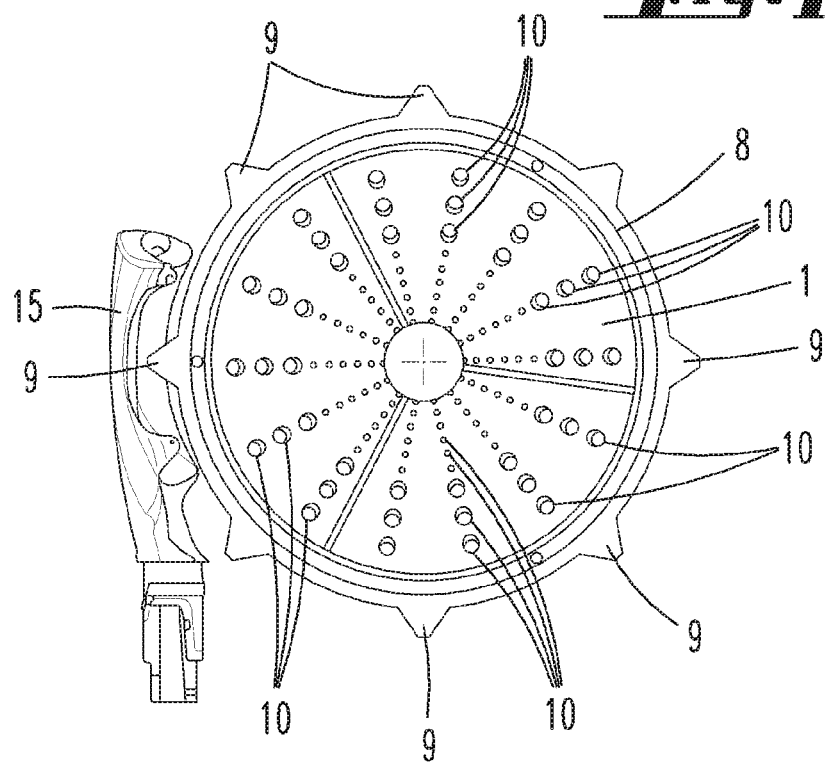
FIG. 12 is a cover element according to another embodiment with a locking element (release state)

FIGS. 11 and 12 show other embodiments of a cover element 1 according to the invention. The cover elements 1 each have eight support elements 9, which are equidistantly arranged on the base contour 8 of the support edge 7. The passage openings 10 are circular in design, wherein their diameter decreases from radially outward to radially inward. The figures each show a release state of the locking device 14. The locking element 15 is here swiveled away from the cover element 1, and hence also from the support element 9, so that the cover element 1 can be removed from the preparation vessel 3 or vessel cover 6. The cover element 1 according to FIG. 12 has a segmented large surface side by comparison to the cover element 1 according to FIG. 11. This can be advantageous during manufacture.

FIG. 13 shows another embodiment of a cover element 1. In this configuration, the cover element 1 has passage openings 10 arranged in four groups, which extend parallel to the circumferential direction along a respective angular range of somewhat less than 90°. The absolute length of the passage openings 10 decreases viewed from radially outward to radially inward. A single circular passage opening 10 is located in the center of the cover element 1. Of course, the passage openings 10 can also have other sizes and shapes than those shown here. This can be flexibly adjusted to the desired functions of the cover element 1.

Finally, FIGS. 14 to 17 show different shapes for the support elements 9. Shown here, for example, are oval, square and triangular shapes, along with a combination comprised of an oval and rectangular shape.

Figure 18:
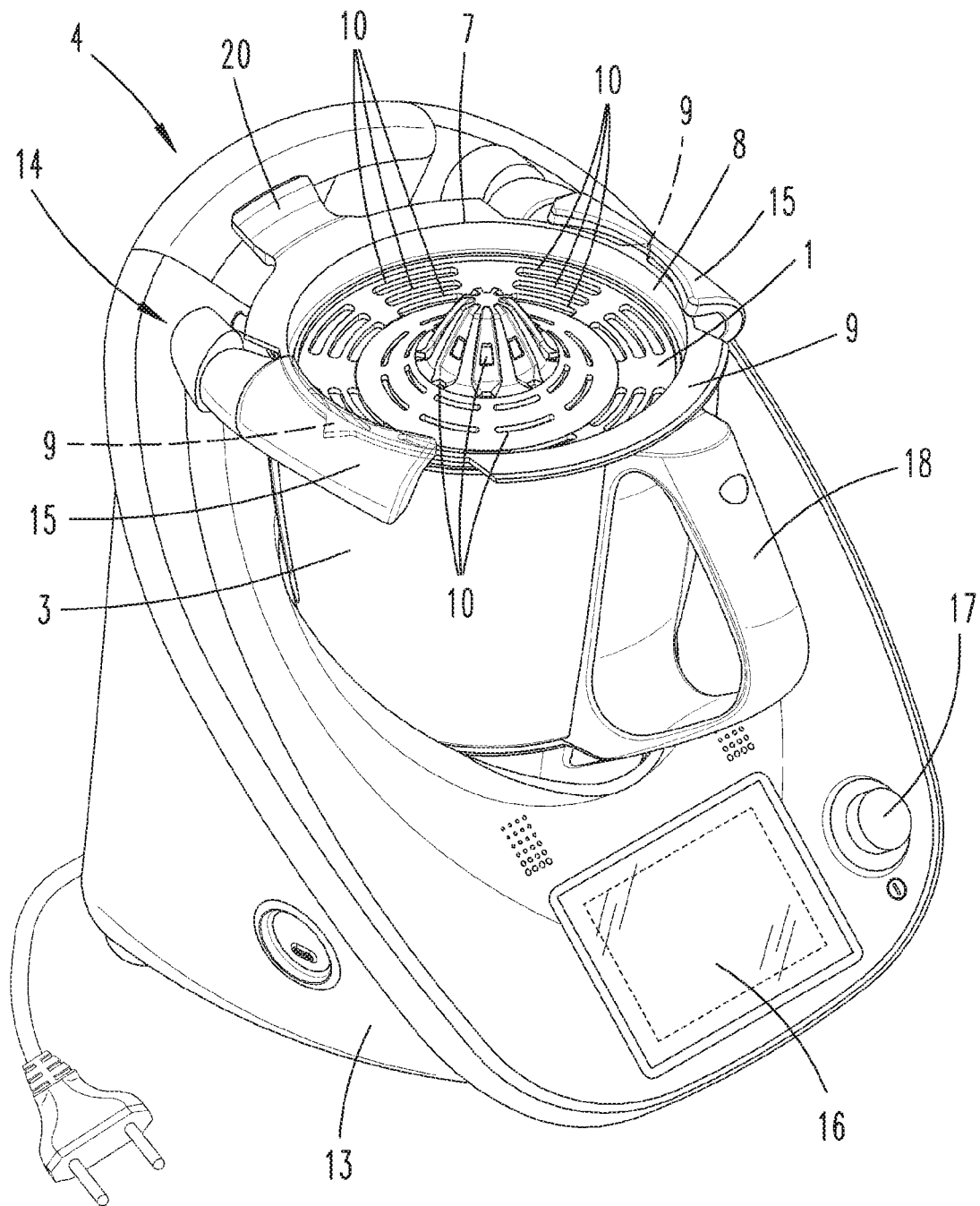
FIG. 18 is a food processor according to the invention with the configuration depicted in FIG. 3 comprised of a preparation vessel and cover element in a locked state.

FIG. 18 shows a food processor 4 with a preparation vessel and a cover element 1 designed as a lemon squeezer, the elevation 11 of which faces upward, i.e., faces away from the preparation vessel 3. As shown on FIG. 3, the cover element 1 is placed on the preparation vessel 3 without interspersing a vessel cover 6, and locked by means of locking elements 15.

REFERENCE LIST

1 Cover element
2 Vessel opening
3 Preparation vessel
4 Food processor
5 Cover opening
6 Vessel cover 7 Support edge
8 Base contour
9 Support element
10 Passage opening
11 Elevation
12 Rib
13 Base device
14 Locking device
15 Locking element
16 Display
17 Switch
18 Vessel handle
19 Cover handle
20 Cover element handle

What is claimed is:

1. A food processor comprising:
   a base device,
   a preparation vessel configured to be arranged on the base device, the preparation vessel having a vessel cover with a central cover opening, and
   a cover element for at least partially covering a vessel opening of the preparation vessel and/or the cover opening of the vessel cover for the preparation vessel, wherein the cover element has a radially outwardly facing support edge that is configured to be supported on the preparation vessel and/or vessel cover, wherein the support edge has a continuously curved base contour when viewed in an axial direction, and the support edge has at least two support elements, which lie opposite each other in relation to a radial direction, are separate from each other viewed in a circumferential direction, and protrude over the base contour, wherein the support elements extend in an imaginary circular ring surface reaching from a radially outer edge of the support elements up to the base contour and have opposing sides that are identically designed viewed in the axial direction, and wherein the support elements are formed in the same plane extending perpendicular to the axial direction;
   wherein the food processor has a locking device configured for locking the cover element with the preparation vessel, wherein the cover element rests on the preparation vessel on a top side and is engaged by the locking device, and/or rests on the vessel cover, and along with the vessel cover is engaged by the locking device,
   wherein the locking device has at least two locking elements that are configured to be driven by an electric motor, wherein the locking elements at least partially grip over the support elements when the cover element is in a locked state.

2. The food processor according to claim 1, wherein at least one of the support elements protrudes over the base contour by at least 10 mm.

3. The food processor according to claim 1, wherein the cover element is designed as a lemon squeezer with a central, conical elevation in relation to a surface side, wherein the elevation is configured to engage into the cover opening of the vessel cover when the cover element is in the locked state.

4. The food processor according to claim 3, wherein the conical elevation has protruding ribs and/or a plurality of passage openings.

5. The food processor according to one claim 1, wherein the cover element has a plurality of passage openings lying one behind and/or next to the other in a radial direction and/or circumferential direction.

6. The food processor according to claim 5, wherein each passage opening has a size of about 1 $mm^2$ to 200 $mm^2$.

7. The food processor according to claim 5, wherein passage openings that are sequential in a radially outwardly facing direction have increasing sizes, so that a passage opening located closer to the support edge is larger than a passage opening that is spaced further apart from the support edge.

8. The food processor according to claim 1, wherein the vessel cover is arranged between the preparation vessel and the cover element when the cover element is in the locked state.

* * * * *